United States Patent
Li (10) Patent No.: US 8,330,763 B2
(45) Date of Patent: Dec. 11, 2012

(54) APPARATUS AND METHOD FOR VOLUME RENDERING ON MULTIPLE GRAPHICS PROCESSING UNITS (GPUS)

(75) Inventor: Wei Li, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1062 days.

(21) Appl. No.: 12/271,311

(22) Filed: Nov. 14, 2008

(65) Prior Publication Data

US 2009/0135180 A1 May 28, 2009

Related U.S. Application Data

(60) Provisional application No. 60/990,742, filed on Nov. 28, 2007.

(51) Int. Cl.
*G06F 15/16* (2006.01)

(52) U.S. Cl. ........ 345/502; 345/424; 345/522; 345/581; 345/629

(58) Field of Classification Search .................. 345/679, 345/419

See application file for complete search history.

(56) References Cited

U.S. PATENT DOCUMENTS

| 7,460,119 | B2 | 12/2008 | Li | |
|---|---|---|---|---|
| 2002/0015055 | A1* | 2/2002 | Foran | 345/679 |
| 2006/0164410 | A1* | 7/2006 | Li | 345/419 |
| 2008/0211816 | A1* | 9/2008 | Gonzalez et al. | 345/505 |

OTHER PUBLICATIONS

S. Marchesin, C. Mongenet, and J.-M. Dischler, "Dynamic Load Balancing for Parallel Volume Rendering", EGPGV '06: Symposium on parallel graphics and visualization; 2006.
Won-Jong Lee, Vason P. Srini and Tack-Don Han, "Adaptive and Scalable Load Balancing Scheme for Sort-Last Parallel Volume Rendering on GPU Clusters", International Workshop on Volume Graphics, 2005, Stony Brook, New York, USA.

\* cited by examiner

*Primary Examiner* — Xiao M. Wu
*Assistant Examiner* — Phi Hoang
(74) *Attorney, Agent, or Firm* — Donald B. Paschburg (57) ABSTRACT

A method for volume rendering a volumetric dataset with multiple graphics processing units (GPUs) coupled to a computer system, comprises building a block hierarchical structure of blocks for the volumetric dataset, the block hierarchy comprising a block sequence; partitioning the block sequence into a plurality of groups; determining a target work load for each GPU; allocating each group of the plurality to a respective GPU in accordance with the target load; rendering respective intermediate images by the respective GPUs; and compositing for a final image by blending the respective intermediate images.

18 Claims, 3 Drawing Sheets

APPARATUS AND METHOD FOR VOLUME RENDERING ON MULTIPLE GRAPHICS PROCESSING UNITS (GPUS)

CROSS-REFERENCE TO RELATED APPLICATION AND CLAIM OF PRIORITY

Specific reference is hereby made to U.S. Provisional Patent Application No. 60/990,742, filed Nov. 28, 2007 in the name of inventor WEI LI and entitled "Volume Rendering On Multiple GPUs", and whereof the disclosure is hereby incorporated herein by reference and whereof the benefit of priority is claimed.

FIELD OF THE INVENTION

The present invention relates generally to the field of volume rendering such as may be used for imaging and, more particularly, to volume rendering utilizing Multiple Graphics Processing Units.

BACKGROUND OF THE INVENTION

While graphic processing units (GPUs) have become an extremely powerful tool as compared with their predecessor versions of a couple of years ago or with the latest central processing units (CPUs), they typically still have a fixed number of pipelines and limited on-board memory. There has been a trend for the volumetric datasets required for visualization to get bigger and bigger. Indeed, some present day datasets are so big that even the latest GPUs have difficulty in handling them.

While more powerful GPUs may become available at some future time, an immediate approach is to exploit multiple GPUs within the same system, so that the workloads are distributed to different GPUs and each GPU renders in parallel. GPU manufacturers have provided multi-GPU capabilities, such as Nvidia's SLI and ATI's CrossFire. These technologies provide a transparent layer that automatically assigns workloads to GPUs, and which does not require any involvement of the application running on top of it. These approaches are very generic in that they do not require any assumption of the specialties of the applications. However, this puts several limitations on applications. Whenever one of these limitations is violated, the performance is severely impacted. In the worst case, the rendering falls back to the speed of single GPU rendering.

BRIEF SUMMARY OF THE INVENTION

It is herein recognized that experimental evidence has shown that using SLI or CrossFire technology does not gain a significant speed advantage for volume rendering while increasing the system cost. It is herein also recognized that the limitation that affects volume rendering most is that any texture used in the rendering has to be fully duplicated on all the GPUs; GPU-based volume rendering is also referred to as texture-based rendering. As indicated by the name, the performance of GPU-based rendering depends heavily on the efficiency of texture handling. Thus, duplicating textures on GPUs is equivalent to reducing the total available GPU memory by a factor of N, where N is the number of GPUs.

In accordance with an aspect of the present invention, a volume rendering approach utilizes multiple GPUs installed in a single computer system. As for single GPU rendering, a block hierarchy is built for a volumetric dataset representing multiple partitioning with different levels of granularity. A sequence of blocks is then built with adaptive granularity and in visibility order. Next, the block sequence is partitioned into multiple groups, one for each GPU. Multiple GPUs then render their workload assignment in parallel.

In accordance with another aspect of the present invention, because the block group has atomic visibility order, each GPU returns only one intermediate image and the final compositing is trivial alpha blending.

In accordance with another aspect of the present invention, the union of the blocks in each group may be concave. This provides more flexibility in load assignment and balancing than previous approaches that enforce convex region assignment.

In accordance with another aspect of the present invention, the interface from the main system to each GPU is in a separate thread for best parallelism.

In accordance with an aspect of the invention, a method for volume rendering a volumetric dataset with multiple graphics processing units (GPU's) coupled to a computer system, comprises building a block hierarchy in form of a block tree containing multiple levels of blocks representing multiple partitioning of the volumetric dataset with different granularities; determining a target work load for each GPU as a percentage of total GPU load; sorting the GPUs in visibility order according to the largest block assigned to a GPU for the previous frame; traversing the block hierarchy in visibility order and partitioning the volumetric data set into a number N of groups of blocks in accordance with a target work load of each respective corresponding GPU, where N equals the number of the GPUs; sorting blocks within each group in visibility order; rendering the groups by corresponding respective GPUs to provide respective intermediate images to a display node; and alpha blending the intermediate images in visibility order.

In accordance with another aspect of the invention, the method includes using a rendering time of the preceding frame to adjust a target workload of the $i^{th}$ GPU in accordance with the following formula:

$$\text{power}[i]=\text{workLoad}[i]/\text{lastRenderingTime}[i]\text{targetWorkload}[i]+=k*(\text{power}[i]/\text{totalPower}-\text{workLoad}[i])$$

wherein totalPower is the sum of all powers of GPUs and k adjusts a rate of approaching load balancing.

In accordance with another aspect of the invention the method includes a step of adaptively balancing the target load for the GPUs within a single frame.

In accordance with another aspect of the invention, the method includes steps for multithreading and interruptible rendering.

In accordance with another aspect of the invention, the method includes a step of recording computer program logic for program code for executing the foregoing steps in a computer program product comprising a computer useable medium.

In accordance with another aspect of the invention, a method for volume rendering a volumetric dataset with multiple graphics processing units (GPUs) coupled to a computer system, comprises building a block hierarchical structure of blocks for the volumetric dataset; partitioning the blocks into a plurality of groups; determining a target work load for each GPU; allocating each group of the plurality to a respective GPU in accordance with the target load; rendering respective intermediate images by the respective GPUs; and compositing for a final image by blending the respective intermediate images.

In accordance with another aspect of the invention, a method for volume rendering a volumetric dataset with multiple graphics processing units (GPUs) coupled to a computer system, comprises building a block hierarchical structure of blocks for the volumetric dataset, the block hierarchy comprising a block sequence; partitioning the block sequence into a plurality of groups; determining a target work load for each GPU; allocating each group of the plurality to a respective GPU in accordance with the target load; rendering respective intermediate images by the respective GPUs; and compositing for a final image by blending the respective intermediate images.

In accordance with another aspect of the invention, a method includes a step of building a block hierarchical structure of blocks comprising building a binary space partitioning tree (BSP tree) for the volumetric dataset; a step of partitioning the block sequence comprising partitioning the volumetric dataset into N groups by utilizing the BSP tree, where N is the number of GPUs; the step of determining a target work load for each GPU comprising determining a target work load for each GPU as a percentage of total GPU load; sorting the GPUs in visibility order according to the largest block assigned to a GPU for the previous frame; and sorting blocks within each group in visibility order.

In accordance with another aspect of the invention, a method includes a step of setting leaf nodes of the binary space partitioning tree (BSP tree) to correspond to leaf blocks exhibiting a level of granularity sufficiently small so as to be subject to given criteria for one of: (a) rendering, and (b) pretermitting the leaf blocks; and identifying the leaf nodes by testing for a single child thereof.

In accordance with another aspect of the invention, a system for imaging for volume rendering a volumetric dataset with multiple graphics processing apparatus (GPU apparatus) coupled to a computer system, comprises memory apparatus for storing a program and other data; and processor apparatus in communication with the memory apparatus, the processor apparatus being operative with the program to perform: building a block hierarchical structure of blocks for the volumetric dataset, the block hierarchy comprising a block sequence; partitioning the block sequence into a plurality of groups; determining a target work load for each GPU; allocating each group of the plurality to a respective GPU in accordance with the target load; rendering respective intermediate images by the respective GPUs; and compositing for a final image by blending the respective intermediate images.

In accordance with another aspect of the invention, a system includes using a rendering time of the preceding frame to adjust a target workload of the $i^{th}$ GPU apparatus in accordance with the following formula:

$$\text{power}[i]\text{workLoad}[i]/\text{lastRenderingTime}[i]\text{targetWorkload}[i]\mathrel{+}=k*(\text{power}[i]/\text{totalPower}-\text{workLoad}[i])$$

wherein totalPower is the sum of all powers of GPUs and k adjusts a rate of approaching load balancing.

In accordance with another aspect of the invention, a system comprises a step of adaptively balancing the target load for the GPU apparatus within a single frame.

In accordance with another aspect of the invention, a system includes steps for multithreading and interruptible rendering.

In accordance with another aspect of the invention, a system includes apparatus for transmitting and receiving any of the volumetric data set and images resulting from the alpha blending by way of any electronic telecommunications medium including infra-red beam, satellite, landline, radio, the Internet, television, and facsimile.

BRIEF DESCRIPTION OF THE SEVERAL VIEWS OF THE DRAWINGS

The invention will be more fully understood from the detailed description which follows, in conjunction with the drawings, in which.

DETAILED DESCRIPTION OF PREFERRED EMBODIMENTS OF THE INVENTION

In summary form, an embodiment of the present invention comprises: a method for volume rendering utilizing multiple GPUs (graphic processing units) installed in a single computer system; as for single GPU rendering, a block hierarchy is built for a volumetric dataset representing multiple partitioning with different levels of granularity; a sequence of blocks is then built with adaptive granularity and in visibility order; next, the block sequence is partitioned into multiple groups, one for each GPU; multiple GPUs then render their workload assignment in parallel; and because the block group has atomic visibility order, each GPU returns only one intermediate image and the final compositing is trivial alpha blending. The union of the blocks in each group can be concave, which provides more flexibility in load assignment and balancing than previous approaches that enforce convex region assignment. The interface from the main system to each GPU is in a separate thread for best parallelism. Such a multi-threading framework that also supports interruptible rendering is herein disclosed. Further features of the present invention, including target workload assignment for the GPUs, and other aspects of the invention will be described below.

Thus, a technology is herein utilized for accelerating volume rendering on multiple GPUs. In contrast to the aforementioned SLI and CrossFire systems, an embodiment of the present invention modifies the volume renderer to control each GPU individually. This technology requires an application programming interface (API) provided by a GPU manufacturer that allows sending commands and data independently to each GPU. Currently, it is available through Nvidia's affinitycontext OpenGL extension, and a similar API for the ATI card is understood to be in planning.

Parallel volume rendering has been extensively studied in academia. The principle is to utilize multiple processing elements (PEs) to cooperatively compute one task in parallel. However, present researches are either focused on multiple CPUs with shared or distributed memory, or studied on GPU clusters with each GPU connected through a network, since multiple GPUs within the same system were not available until recently.

One of the main characteristics of a GPU that affects volume rendering is that the on-board memory bandwidth is an order of magnitude higher than the bandwidth between system memory and the GPU as well as among GPUs. For example, at the end of 2007, high-end GPUs have reached over 100 GB/s for video memory bandwidth, whereas the practical one way transfer rate of a PCIe x16, the current standard interface to GPU, is usually less than 3 GB/s. The theoretical one way bandwidth of a PCe x16 is 4 GB/s, but due to its nature of serial transfer, there is a 25% overhead in transferring control information. PCIe, short for PCI Express, refers to a bus coupling the computer's microprocessor to peripheral cards. The on-board memory bandwidth scales linearly with the number of GPUs because each GPU has its own dedicated memory and memory interface. On the other hand, the PCIe lanes between a GPU board and the main system could be shared by multiple GPU devices. This makes the bandwidth difference more significant. As a result, it has been a common strategy for GPU-based volume rendering to avoid transferring datasets across the PCIe interface as much as possible.

Some of the parallel volume rendering algorithms are designed for shared memory systems, in that all processors access any portion of the memory at the same speed. Hence, there is no need to transfer data from one processor to another. In other words, the transfer cost is zero. In a distributed system, data is exchanged through a network between PEs. The network bandwidth is usually significantly slower than direct memory accessing. The PCIe interface that connects one GPU to a main system, then to other GPUs, is typically slower than direct memory access but is faster than network communication. Modern GPUs have exhibited computing power orders of magnitude higher than CPUs in tasks resembling stream processing, such as volume rendering. Even in a distributed memory system where communication is slow, the time that a PE renders a portion of a volume is either longer or comparable to transferring the sub volume. Therefore, most of the reported parallel volume rendering approaches concentrate on distributing sub-volumes dynamically during the rendering! to achieve load balancing, and better performance.

In a multi-GPU system, the data transferring stage, if there is any, is usually the bottleneck. Once the required data is in video memory, the rendering could be done in a much shorter time than the transferring. Consequently, most of the previous parallel volume rendering techniques are not suitable for a multi-GPU system.

In accordance with a aspect of the present invention, a volume rendering approach based on multi-GPU is disclosed. An exemplary embodiment focuses on a single machine equipped with multiple GPUs, without implying or intending any limitation thereby since the algorithm in accordance with the present invention is extendable to a cluster of multi-GPU computers. Adapting to the current and probably future GPU and CPU performance profiles, an example of a renderer in accordance with the present invention is designed in accordance with the following guiding principles: (1) minimizing data transfer between GPU and CPU, and between GPUs; and (2) balancing the rendering workload among GPUs and minimizing the total idle time of all GPUs.

As stated above, basically, for N GPUs, a volume is divided into N portions, and each GPU is assigned one portion. The voxels inside each portion form one connected region. The visibility order of the portions is atomic in that all the voxels of any connected region are either completely in front, or completely in back of, another connected region. The definition of "atomic" in relation to the visibility order will be further explained below. The number of voxels of each connected region is proportional to each GPU's rendering power. The embodiment in accordance with the present invention supports adaptive load balancing in that one connected region could shift some of its voxels to its direct neighbors. After the shifting, every connected region is still connected, and still possesses the characteristic of atomic visibility order.

Traditionally, parallel volume rendering algorithms are classified into two categories: sort-first, and sort-last. A sort-first algorithm typically partitions the image space in multiple rectangles and assigns each PE one or more rectangles. The dataset could also be partitioned into axis-aligned bricks. Each rectangle is attached with a list of bricks that cover the rectangle. The bricks are sorted in visibility order. The final compositing stage is simply tiling the rectangles. A sort-last algorithm, on the other hand, partitions a dataset into multiple sub-volumes. Each sub-volume is rendered into an intermediate image on its assigned PE. All the intermediate images are then collected to and composited on the display node. Sort-first avoids most of the cost of transferring and compositing intermediate images, while sort-last has explicit control in data distribution, which is critical in texture-based volume rendering when there is not enough room to replicate the whole dataset on all GPU memories.

The approach in accordance with principles of the present invention, strictly speaking, is a sort-last approach. However, in this approach, each PE renders a connected volume region composed of a list of bricks that have atomic visibility order. The bricks in the list are sorted in visibility order before rendering. Therefore, each PE returns only a single intermediate image. Each intermediate image is usually significantly smaller than the final image and it contains only the color information. In other words, we do not need additional information, such as depth, for the compositing stage. Sorting the intermediate images in visibility order is technically trivial. In this sense, the approach in accordance with principles of the present invention has the advantage of both sort-first and sort-last approaches.

The description continues below in further detail and the atomic visibility order is next considered. As explained in the foregoing description, a fundamental reason for a parallel algorithm gaining a speed advantage over a corresponding serial algorithm is that the workload is distributed to multiple processing elements (PEs), and each portion of the workload is processed simultaneously. When the computation is done on a PE, the computed results usually are sent back to a centralized displaying node, and are combined with the results from other PEs so that the output of the parallel algorithm is the same as that of the corresponding serial algorithm.

In computer graphics, rendering generally takes a 3D model as input. The 3D model is usually represented as a polygonal mesh (for surface rendering) composed of a set of polygons, or a volumetric dataset (for volume rendering) composed of voxels. For either a surface model or a volume model, the output is a 2D image, or a sequence of 2D images. Therefore, in a parallel rendering algorithm each rendering processor renders a subset of the model elements (polygons or voxels) of the 3D model, and then the 2D images from all PEs are sent to a display node that composites all the images to form the final image.

The polygon or voxel elements within a 3D model can be sorted into either a front-to-back or back-to-front visibility order. Element A is in front of element B if any ray starting from the camera that intersects both A and B hits A before B. Note that for elements whose projections on an image plane do not overlap: their visibility order is interchangeable. We say that elements in a subset of a 3D model are in atomic visibility order if all the elements are completely in front of or interchangeable with any element outside the subset, or completely behind or interchangeable with any other element outside the subset. Compositing images rendered from subsets with atomic visibility order is simply done by alpha blending the images in visibility order, either front-to-back or back-to-front.

The workload assignment is next considered. For each volume dataset, we compute a block hierarchy in a preprocessing step as described in copending U.S. patent application Ser. No. 11/235,408 entitled INVISIBLE SPACE SKIPPING WITH ADAPTIVE GRANULARITY FOR TEXTURE-BASED VOLUME RENDERING and filed in the name of Wei Li, who is also the inventor in the present patent application, and to which reference is made for further background details and whereof the disclosure is hereby incorporated herein by reference.

This step can be summarized as follows, in accordance with the description in the aforementioned copending patent application Ser. No. 11/235,408. Blocks are organized hierarchically using a tree structure where each node is associated with a single block. Leaf nodes correspond to blocks with the finest granularity; that is, the leaf nodes are the smallest units that are either rendered or skipped.

These blocks are defined by recursively dividing the volume/subvolume along the largest dimension of the volume/subvolume and preserving the alignment with the original dataset. The number of nodes in the first (or bottom) level is an integer power of two, which provides a fully balanced binary tree. A fully balanced binary tree provides the following benefits: identifying a leaf node only requires a single child to be tested, providing better consistency for search, by minimizing the expected number of searches, and providing more efficient storage: an interior node cannot have a null pointer.

Neighboring blocks are merged to create blocks with coarser granularity and remain rectangular boxes, which are larger and reside at higher levels of the tree. This step builds the second finest level of granularity. The process is repeated until the coarsest granularity contains only a single block that encompasses the original volume. This data structure is known as a binary space partitioning tree (BSP tree) or a KD tree. The appropriate granularity of blocks used for rendering is obtained by moving up or down levels of the BSP tree. Other hierarchical data structures such as an octree could also be used to organize the blocks. The BSP tree, however, is desirable because it is effective for fitting data and has a relatively low overhead for memory required to represent the hierarchy.

Thus, the block hierarchy is organized in the form of block trees that contains multiple levels of blocks representing the multiple partitioning of the volume in different granularities. The block tree is then used to partition the volume to N groups, where N is the number of GPUs, as well as sorting the blocks within each group into visibility order.

Figure 1:
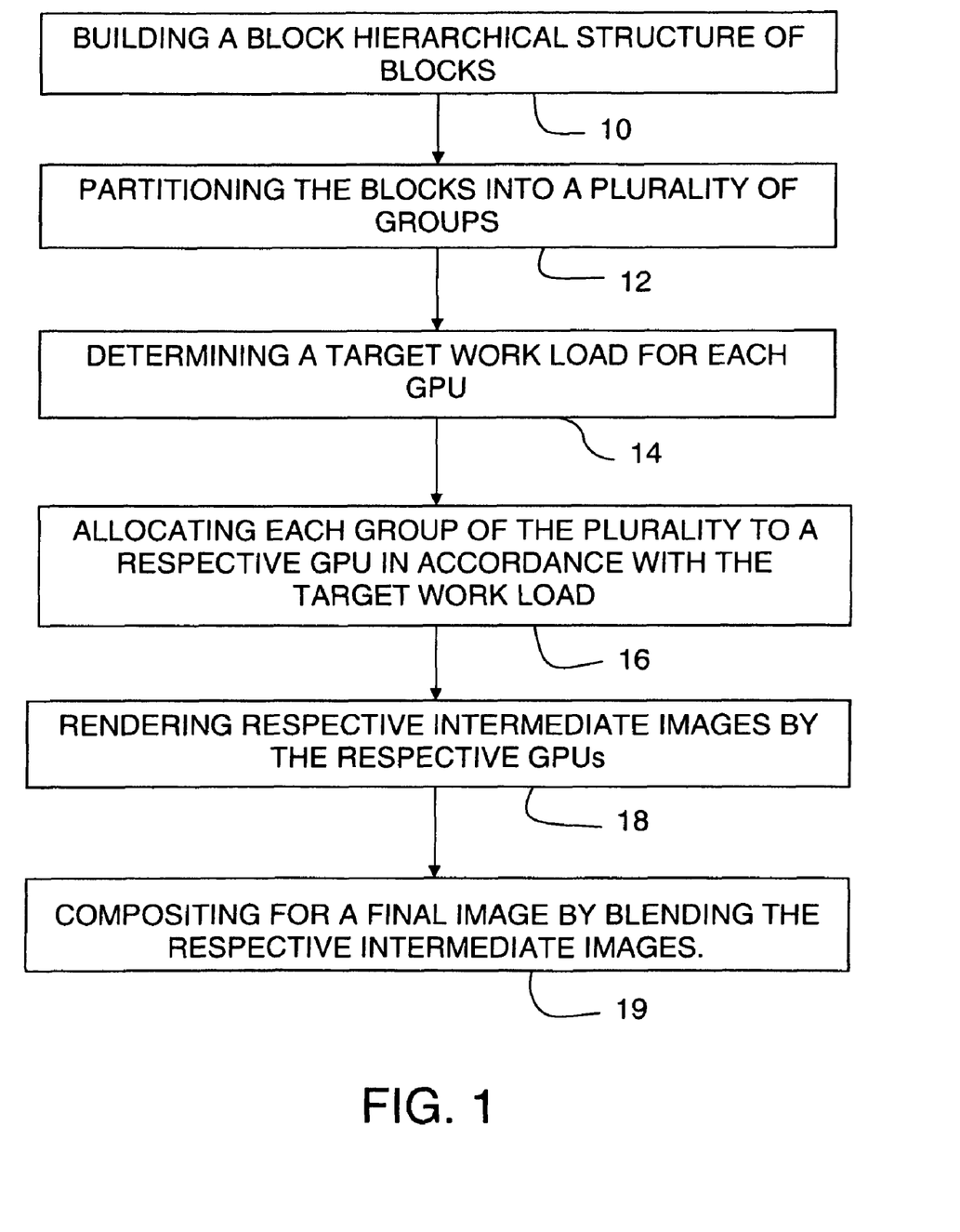
FIG. 1 shows data flow in a flow chart schematic diagram in accordance with principles of the present invention.

In conjunction with the present description, reference is made to FIG. 1 which shows a schematic flow chart for a method in accordance with principles of the present invention for volume rendering a volumetric dataset with multiple graphics processing units (GPUs) coupled to a computer system. The reference numerals on the chart indicate the following steps: building a block hierarchical structure of blocks for the volumetric dataset (10); partitioning the blocks into a plurality of groups (12); determining a target work load for each GPU (14); allocating each group of the plurality to a respective GPU in accordance with the target load (16); rendering respective intermediate images by the respective GPUs (18); and compositing for a final image by blending the respective intermediate images (19).

Figure 2:
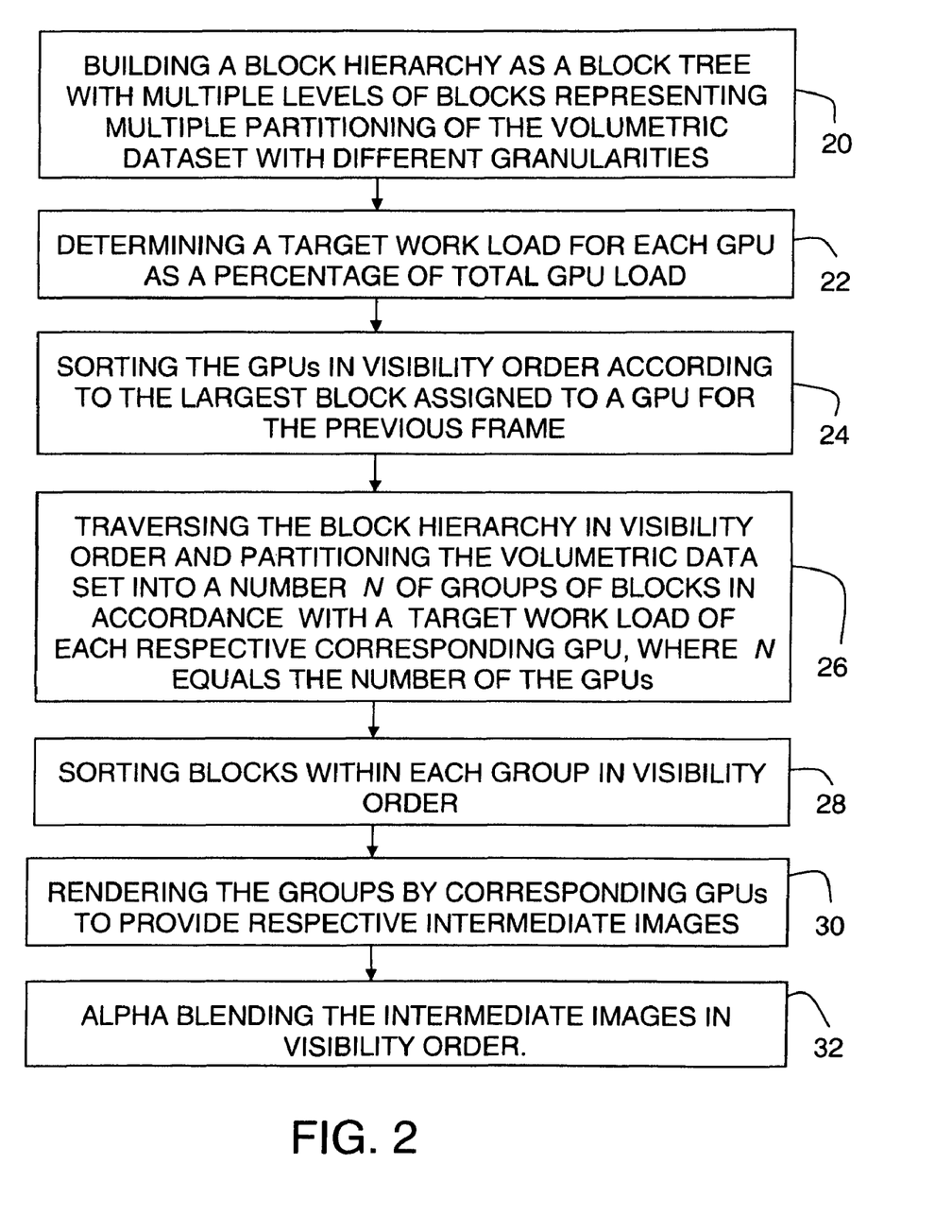
FIG. 2 shows data flow in a flow chart schematic diagram, at a different level of detail, in accordance with principles of the present invention.

Reference is made to FIG. 2 which shows a schematic flow chart at a different level from that shown in FIG. 1 for a method in accordance with principles of the present invention for volume rendering a volumetric dataset with multiple graphics processing units (GPUs) coupled to a computer system. In FIG. 2, the reference numerals on the chart indicate the following steps: building a block hierarchy in form of a block tree containing multiple levels of blocks representing multiple partitioning of the volumetric dataset with different granularities (20); determining a target work load for each GPU as a percentage of total GPU load (22); sorting the GPUs in visibility order according to the largest block assigned to a GPU for the previous frame (24); traversing the block hierarchy in visibility order and partitioning the volumetric data set into a number N of groups of blocks in accordance with a target work load of each respective corresponding GPU, where N equals the number of the GPUs (26); sorting blocks within each group in visibility order (28); rendering the groups by corresponding respective GPUs to provide respective intermediate images to a display node (30); and alpha blending the respective intermediate images in visibility order (32).

The rendering is performed in the following steps:
1. Determine the target work load of each GPU in percentage of the total load.
2. Sort GPUs in visibility order according to the largest block assigned to a GPU for the previous frame.
3. Traverse the block hierarchy in visibility order, and partition the dataset into groups of blocks according to the target work load of the corresponding GPU. The blocks within each group are sorted in visibility order.
4. Each GPU renders its assigned list of blocks.
5. Each GPU sends a rendered image to the display node, and these images are alpha blended in visibility order.

In step 1, each GPU is assigned a target workload, represented as a percentage of the total workload. The target workload is a function of the computation and storage resources of each GPU. In the simplest case when all the GPUs are the same and they are not shared by other rendering tasks, each GPU is just assigned the same target load. The present invention also supports dynamic load balancing as will be further described below.

The workload is assigned as a list of blocks. In step (3), the block tree is traversed top-down in visibility order from the coarsest granularity (the largest blocks) towards the finest granularity (the smallest blocks). As discussed above, we want the blocks assigned to any GPU to have atomic visibility order. Therefore, the workload is assigned sequentially. In other words, the algorithm finishes the assignment of a GPU before it moves on to the next GPU. Since the block tree is traversed top-down, the approach in accordance with principles of the present invention attempts to assign big blocks first.

We use the iterator and filter approaches to traverse the tree as described in the aforementioned pending patent application Ser. No. 11/235.408. We utilize the visibility iterator, and have designed the assignment filter. Following is the pseudocode of the isGood( ) method. When the isGood( ) function returns true, the node being tested is returned by the iterator, and the block associated with the node is assigned to the current GPU. The filter also maintains a current GPU index in currentWorker. When the target workload of the current GPU has been reached, the filter moves the current GPU index to the next one in the GPU list sorted in visibility order.

loadErrorThresh is a parameter that balances between the assignment accuracy and avoiding smaller blocks.

```
bool isGood(node) {
    if(targetReached)
        // the previous block assignment reaches the target of the
        //current worker, proceed to the next worker
    {
        // Switch to the next worker
        currentWorker ++; targetReached
        = FALSE; assignedLoad = 0;
    }
    if ( !isEmpty(node)) {
        const FLT32 load = getWorkLoad(node);
        if(targetLoad[currentWorker]   *   (1.Of + loadErrorThresh)
            >= load + assignedLoad)
        {
            assignedLoad += load;
            if(targetLoad *  (1.Of - loadErrorThresh)
                <= assignedLoad) targetReached = TRUE;
            return TRUE;
        }
        else if(node.isLeaf( ))
        {
            // Can't subdivide,   finish with this target
            currentWorker ++; assignedLoad = load; return
            TRUE;
        }
    }
    return FALSE;
}
```

Textures are loaded into GPU memory in bricks. Typically, bricks are uniform boxes each containing a sub-volume of the dataset. As was explained, the blocks in accordance with principles of the present invention are of various sizes representing a different granularity of dataset partitioning. Therefore, some blocks span across multiple bricks, while some blocks are completely enclosed within single bricks. For best performance, each GPU caches bricks in video memory as much as possible to reduce the amount of voxels that are transferred from system memory to GPU memory. The visibility order of blocks changes with the viewing direction. To improve cache coherency, we want to minimize the changes to each GPU's block list between frames. It is simply done by associating each GPU with its largest block assigned in the previous frame. Step 2 is for this purpose.

Once the workload is assigned, each GPU can start its rendering task (step 4). Because the blocks assigned to each GPU have atomic visibility order, the GPU only returns one intermediate image containing the RGBA color information to the displaying GPU for final compositing, and the final compositing is simply alpha blending (step 5). Each returned intermediate image defined by a bounding rectangle is optimized for the modified pixels, and in most cases is only a portion of the full image. The bounding rectangle of the changed pixels is found by projecting the bounding boxes of rendered blocks.

Adaptive load balancing is next considered. The rendering time is a function of several factors, and is not strictly proportional to the number of voxels. For example, some voxels could be occluded by other voxels in front of them, and some voxels could fall outside the view frustum especially when a user zooms in to a certain region. Moreover, the GPUs could be shared by other tasks. Therefore, two approaches to adaptively balance the workload among rendering nodes are adopted.

The first approach uses the rendering time of the previous frame to adjust the target workload of the $i^{th}$ GPU using the following formula:

power[$i$]workLoad[$i$]/lastRenderingTime[$i$]target-
Workload[$i$]+=$k$*(power[$i$]/totalPower-work-
Load[$i$])

where totalPower is the sum of power of all GPUs. The parameter k adjusts the rate of approaching load balancing. A higher rate could result in oscillation in workload shifting and rendering time. In practice, 0.5 is found to be a reasonable choice for k.

The performance of this approach depends on the frame-to-frame coherence of the rendering time ratio of the GPUs. Note that it does not rely on the inter-frame coherence of intermediate images, nor on the rendering time, but on the rendering time ratio among GPUs. For example, a user could abruptly change the viewing angle, or jump to a significantly different zoom factor, resulting in large changes of the intermediate images or the rendering time, whereas the rendering time ratio between GPUs generally stays within a small range.

If the rendering time ratio changes abruptly, such as when a large portion of blocks changes visibility on some GPUs due to cut-plane or panning out of the view port, or the computation or storage requirement by other tasks changes by a large amount, but only on certain GPUs, then the above approach will fail to adjust the workload towards the balanced state. To handle this situation, a further approach to adjust workload within the rendering of a single frame is also herein disclosed, as will be explained below.

Dynamic load balancing within a single frame requires the capability of a GPU to move its workload to other GPUs before finishing rendering the frame. However, we want to avoid the overhead of returning multiple intermediate images from one rendering node which is common in the sort last approach. Instead, we restrict the load shifting to the front and back rendering nodes in the visibility order only. As discussed above, the GPUs are sorted in visibility order of their workload, and the blocks assigned to each GPU are also sorted. Rather than rendering its blocks front-to-back or back-to-front as in the foregoing embodiment, a GPU starts from the middle block in its workload list, and then picks the adjacent front and back blocks alternately and continues with blocks further away from the center. In other words, the blocks next to the block list of other GPUs in the visibility order are rendered last. The blending function is switched between front-to-back and back-to-front. If one GPU finishes its work earlier, it will check its two neighbors, and take the block from the head or tail of the GPU that has more unfinished work load. This method still preserves the atomic visibility of the blocks rendered by each GPU, so that each GPU still returns only a single intermediate image, and the final compositing is still alpha blending. For better balancing, large blocks can be split to smaller ones when they are picked for rendering or shifted to other rendering nodes.

Using the rendering time of the previous frame has been reported in S. Marchesin, C. Mongenet, and J. -M Dischler, Dynamic Load Balancing for Parallel Volume Rendering, EGPGV'06: symposium on parallel graphics and visualization, 2006. An important feature of the present invention is in workload assignment and adjustment. The approach in the aforementioned publication by Marchesin et al. uses multiple axis aligned splitting planes to partition the dataset and shifts appropriate splitting planes one slice at a time to rebalance the work load. However, this approach has a disadvantage for bricked volume rendering, because all bricks along the moved planes need to be reloaded. In contrast in accordance with an aspect of the present invention, complete blocks are transferred from GPU to GPU. These blocks are usually small because, in accordance with the present invention, large blocks are tied to GPUs, and each block affects only one brick. The one slice per step in Marchesin et al. also converges to load balanced state at a slower speed as compared with the present invention.

In the publication by Won-Jong Lee, Vason P. Srini and Tack-Don Han, "Adaptive and Scalable Load Balancing Scheme for Sort-Last Parallel Volume Rendering on GPU Clusters", International Workshop on Volume Graphics, 2005, Stony Brook, N.Y., USA, an additional BSP tree is built for volume partitioning by assuming the number of rendering nodes is power-of-two. Building the BSP tree however requires extra computing time. Both the aforementioned publications by Marchesin et al. and by Lee et al. partition a volume into box-shaped shares and each share is a convex shape to facilitate visibility sorting and compositing. However, in accordance with principles of the present invention, the convex requirement is unnecessary; instead, it is sufficient to keep each GPU's workload share having the atomic visibility order. Therefore, the present invention utilizes the original hierarchical structure of blocks for both data partitioning and visibility sorting.

Note that in accordance with the present invention, the combined shape of a set of blocks could be non-nonvex, which however, does not introduce any cost for the final compositing.

Next, multithreading and interruptible rendering are considered. For best performance, the API functions of each GPU should be called from different threads, so that no GPU waits for another GPU to download a dataset or to send back an image. For large datasets, the rendering could be slow. If a user changes their mind during the rendering of an image and wants to change viewing parameter, they should be able to interrupt the rendering.

Following is the pseudo-code running in the main thread or display thread for multi-threading and interruptible rendering in our multi-GPU rendering.

```
for(SINT32 i = 0;   i < numGpus; i++) {
    multiGpuTask[i]->run( );
    hEvents[i] = multiGpuTask[i]->getEvent( );
}
BOOL32 imcomplete = TRUE; SINT32
gpuCompleted = 0; BOOL32 aborted
= FALSE; while(imcomplete) {
    WaitForMultipleObjects(
            numGpus,        // number of objects in array
            hEvents,        //* array of objects
            FALSE,          //* wait for any
              50);          // wait for 50 ntili seconds
    If an event from a rendering thread comes {
        gpuCompleted ++;
        if(gpuCompleted == numGpus)
        imcomplete = FALSE; const SINT32 gpuId = dwEvent −
        WAIT_OBJECT_0; if(multiGpuTask[gpuId]->isAborted( ))
        aborted = TRUE;
    }
    else if a time_out event comes {
        If user wants to cancel the rendering
        {
            aborted = TRUE;
            notify all rendering threads to abort
        }
    }
}
if(!aborted)
    composite image in visibility order
```

The main thread starts multiple rendering threads, one for each GPU, or wakes them up if they have started and are in sleep. The main thread then gets into sleeping mode while waiting for events from the rendering threads, or a timeout event by calling WaitForMultipleObjects( ).

If an event being awaited arrives, the thread is awakened, and the if statement after WaitForMultipleObjects is executed. A rendering thread signals its associated event if it has completed rendering and sending the image. When such an event occurs, the gpuCompleted counter is incremented. If all GPUs have completed, the execution breaks the event waiting loop. If a timeout event arrives, it checks whether the user wants to cancel rendering and, if so, it notifies all rendering threads to abort. Each rendering thread checks the abort signal periodically. In case of such a signal, a rendering thread stops the rendering and sleeps.

Figure 3:
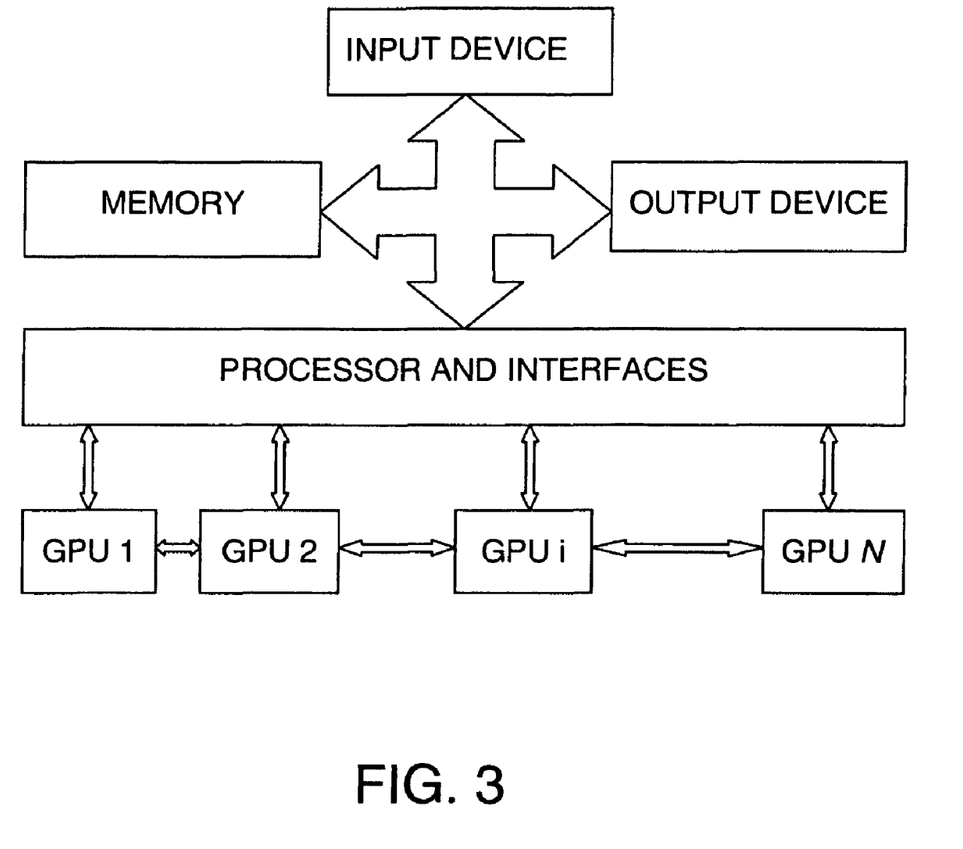
FIG. 3 shows in basic schematic form a digital computer as may be used in embodiments of the present invention.

As will be apparent, the present invention for an apparatus and method for volume rendering on multiple graphics processing units (GPUs) is intended to be implemented with the use and/or application of imaging equipment in conjunction with a programmed digital computer. FIG. 3 shows in general terms and in basic schematic form a digital processor coupled for two way data communication with an input device, an output device, and a memory device for storing a program and other data. The input device is so designated in broad terms as a device for exchanging data, for example, relating to an image or images, or commands for processing in accordance with the present invention. For example, an input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may be for data, commands, and/or it may include a computer type display device using any suitable apparatus such as a cathode-ray kinescope tube, a plasma display, liquid crystal display, and so forth, and serve as a user interface as utilized in the described exemplary embodiment, or it may or may not include a device for rendering an image and may include a memory for storing an image, or measurement parameters or commands for further processing, or for viewing, or evaluation, as may be convenient, or it may utilize a connection or coupling including such as are noted above in relation to the input device. The processor is operative with a program set up in accordance with the present invention for implementing steps of the invention. A number N of GPUs (graphic processing units), indicated in FIG. 3 as GPU1, GPU2 . . . GPUi . . . GPUN, are coupled to the processor in accordance with principles of the present invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing the method of the present invention.

The present invention has also been explained in part by way of examples using illustrative exemplary embodiments. It will be understood that the description by way of exemplary embodiments is not intended to be limiting and that, while the present invention is broadly applicable, it is helpful to also illustrate its principles, without loss of generality, by way of exemplary embodiments relating to an important field of application for the present invention, namely, to computer vision and imaging. For example, the described embodiments typically illustrate operation in real time, this being generally a preferred mode of operation.

It will also be understood that various changes and substitutions not necessarily herein explicitly described may be made without departing from the spirit and scope of the invention which is defined by the claims following.

What is claimed is:

1. A method for volume rendering a volumetric dataset with multiple graphics processing units (GPUs) coupled to a computer system, comprising:
    building a block hierarchy in form of a block tree containing multiple levels of blocks representing multiple partitioning of said volumetric dataset with different granularities;
    determining a target work load for each GPU as a percentage of total GPU load, wherein each target work load is based on computation resources and storage resources of a corresponding GPU;
    sorting said GPUs in visibility order according to the largest block assigned to a GPU for a preceding frame;
    traversing said block hierarchy in visibility order and partitioning said volumetric data set into a number N of groups of blocks in accordance with a target work load of each respective corresponding GPU, where N equals the number of said GPUs;
    sorting blocks within each group in visibility order;
    rendering said groups by corresponding respective GPUs to provide respective intermediate images to a display node;
    alpha blending said intermediate images in visibility order; and
    adjusting the target work load of each GPU based on a rendering time of the preceding frame of the respective GPU, and a sum of power of all of the GPUs.

2. A method as recited in claim 1, wherein
the target work load of each GPU is adjusted in accordance with the following formula:

power[$i$]=workLoad[$i$]/lastRenderingTime[$i$]targetWorkload[$i$]+=$k$*(power[$i$]/totalPower−workLoad[$i$])

wherein i corresponds to a current GPU, totalPower is the sum of powers of all of the GPUs, and k controls a rate of approaching load balancing.

3. A method as recited in claim 2, wherein k is set to 0.5.

4. A method as recited in claim 1, further comprising adaptively balancing said target work load for said GPUs within a single frame, the adaptive balancing comprising:
    sorting by said GPUs starting from a middle block of said group of blocks for blending and thereafter alternately applying a blending function from front to back and back to front, outwardly from said middle block; and
    checking of two adjacent neighbors by any of said GPUs having completed its rendering; and, if one of said GPU neighbors has an unfinished work load, then
    taking for rendering a block from one of (a) the back and (b) the front of said one of said GPU neighbors having an unfinished work load.

5. A method as recited in claim 1, further comprising:
    starting multiple rendering threads, one for each GPU, by a main rendering thread;
    entering a sleeping mode by said main rendering thread while in an event awaiting loop for sensing one of (a) an event from a rendering thread signaling its completion of rendering and (b) a time-out signal; and
    when all GPUs have completed, breaking said event waiting loop and, if a time-out occurs, then
    checking by said main rendering thread whether a user has indicated wanting to cancel rendering and,
    if so, said main rendering thread notifies said rendering threads to abort.

6. A method as recited in claim 1, wherein a computer program logic for program code is embodied in a computer program product comprising a non-transitory computer useable medium executable by a processor to perform the method for volume rendering the volumetric dataset.

7. A method for volume rendering a volumetric dataset with multiple graphics processing units (GPUs) coupled to a computer system, comprising:
    building a block hierarchical structure of blocks for said volumetric dataset;
    partitioning said blocks into a plurality of groups;
    determining a target work load for each GPU, wherein each target work load is based on computation resources and storage resources of a corresponding GPU;
    allocating each group of said plurality to a respective GPU in accordance with said target work load;
    rendering respective intermediate images by said respective GPUs; and
    compositing for a final image by blending said respective intermediate images,
    wherein building a block hierarchical structure further comprises associating individual nodes of said hierarchical structure with respective single blocks, and arranging said blocks in a block sequence of respective granularities,
    wherein building said block hierarchical structure of blocks further comprises building a binary space partitioning tree (BSP tree) for said volumetric dataset, partitioning said blocks further comprises partitioning said volumetric dataset into N groups by utilizing said BSP tree, where N is the number of GPUs,
    wherein determining said target work load for each GPU further comprises determining a target work load for each GPU as a percentage of total GPU load, the method further comprising sorting said GPUs in visibility order according to the largest block assigned to a GPU for a preceding frame, and sorting blocks within each group in visibility order,
    wherein building said binary space partitioning tree (BSP tree) further comprises deriving a plurality of blocks by dividing said volumetric dataset and its subvolumes along the largest dimension thereof and preserving alignment with said volumetric dataset, merging adjacent blocks to derive blocks exhibiting coarser granularity than said adjacent blocks, repeating the foregoing step until a coarsest granularity is reached which contains a single block comprising said volumetric dataset, and arranging said blocks to form said binary space partitioning tree (BSP tree), and
    wherein arranging said blocks further comprises causing a union of blocks in a group, wherein said union is one of (a) concave and (b) convex.

8. A method as recited in claim 7, wherein
rendering said respective intermediate image further comprises providing said respective intermediate image with atomic visibility, and
compositing for a final image further comprises compositing for a final image by alpha blending of said respective intermediate images.

9. A method as recited in claim 7, wherein arranging said blocks further comprises arranging said sequence in a hierarchical order of adaptive granularity and atomic visibility.

10. A method as recited in claim 7, further comprising:
    setting leaf nodes of said binary space partitioning tree (BSP tree) to correspond to leaf blocks exhibiting a level of granularity sufficiently small so as to be subject to given criteria for one of: (a) rendering, and (b) pretermitting said leaf blocks; and
    identifying said leaf nodes by testing for a single child thereof.

11. A system for imaging for volume rendering a volumetric dataset with multiple graphics processing means (GPU means) coupled to a computer system, comprising:
    memory means for storing a program and other data; and
    processor means in communication with said memory means, said processor means being operative with said program to perform:
    building a block hierarchy in form of a block tree containing multiple levels of blocks representing multiple partitioning of said volumetric dataset with different granularities;
    determining a target work load for each GPU means as a percentage of total GPU means load, wherein each target work load is based on computation resources and storage resources of a corresponding GPU;
    sorting said GPU means in visibility order according to the largest block assigned to a GPU means for a preceding frame;
    traversing said block hierarchy in visibility order and partitioning said volumetric data set into a number N of groups of blocks in accordance with a target work load of each respective corresponding GPU, where N equals the number of said GPU means;
    sorting blocks within each group in visibility order;
    rendering said groups by corresponding respective GPU means to provide respective intermediate images to a display node;
    alpha blending said intermediate images in visibility order; and
    adaptively balancing said target work load for said GPU means within a single frame, the adaptive balancing comprising:
    sorting by said GPU means starting from a middle block of said group of blocks for blending and thereafter alternately applying a blending function from front to back and back to front, outwardly from said middle block;
    checking of two adjacent neighbors by any of said GPU means having completed its rendering; and, if one of said GPU neighbors has an unfinished work load, then:
    taking for rendering a block from one of (a) the back and (b) the front of said one of said GPU neighbors having an unfinished work load.

12. A system as recited in claim 11, including:
    using a rendering time of the preceding frame to adjust a target work load of an $i^{th}$ GPU means in accordance with the following formula:

$$\text{power}[i] = \text{workLoad}[i]/\text{lastRenderingTime}[i]\text{targetWorkload}[i] += k*(\text{power}[i]/\text{totalPower} - \text{workLoad}[i])$$

wherein totalPower is a sum of powers of all of the GPUs and k controls a rate of approaching load balancing.

13. A system as recited in claim 12, wherein using a rendering time comprises setting k to 0.5.

14. A system as recited in claim 11, further comprising:
    starting multiple rendering threads, one for each means, by a main rendering thread;
    entering a sleeping mode by said main rendering thread while in an event awaiting loop for sensing one of (a) an event from a rendering thread signaling its completion of rendering and (b) a time-out signal;
    when all GPU means have completed, breaking said event waiting loop; and
    if a time-out occurs, checking by said main rendering thread whether a user has indicated wanting to cancel rendering; and
    if so, said main rendering thread notifies said rendering threads to abort.

15. A system as recited in claim 11, further comprising means for transmitting and receiving any of said volumetric data set and images resulting from said alpha blending by way of any electronic telecommunications medium including infra-red beam, satellite, landline, radio, the Internet, television, and facsimile.

16. A method for volume rendering a volumetric dataset with multiple graphics processing units (GPUs) coupled to a computer system, comprising:
    building a block hierarchy in form of a block tree containing multiple levels of blocks representing multiple partitioning of said volumetric dataset with different granularities;
    determining a target work load for each GPU as a percentage of total GPU load;
    sorting said GPUs in visibility order according to the largest block assigned to a GPU for a preceding frame;
    traversing said block hierarchy in visibility order and partitioning said volumetric data set into a number N of groups of blocks in accordance with a target work load of each respective corresponding GPU, where N equals the number of said GPUs;
    sorting blocks within each group in visibility order;
    rendering said groups by corresponding respective GPUs to provide respective intermediate images to a display node;
    alpha blending said intermediate images in visibility order; and
    using a rendering time of the preceding frame to adjust a target work load of an $o^{th}$ GPU in accordance with the following formula:

$$\text{power}[i] = \text{workLoad}[i]/\text{lastRenderingTime}[i]\text{targetWorkload}[i] += k*(\text{power}[i]/\text{totalPower} - \text{workLoad}[i])$$

wherein totalPower is the sum of all powers of GPUs and k adjusts a rate of approaching load balancing.

17. A method for volume rendering a volumetric dataset with multiple graphics processing units (GPUs) coupled to a computer system, comprising:
    building a block hierarchy in form of a block tree containing multiple levels of blocks representing multiple partitioning of said volumetric dataset with different granularities;
    determining a target work load for each GPU as a percentage of total GPU load;
    sorting said GPUs in visibility order according to the largest block assigned to a GPU for a preceding frame;
    traversing said block hierarchy in visibility order and partitioning said volumetric data set into a number N of groups of blocks in accordance with a target work load of each respective corresponding GPU, where N equals the number of said GPUs;
    sorting blocks within each group in visibility order;
    rendering said groups by corresponding respective GPUs to provide respective intermediate images to a display node;

alpha blending said intermediate images in visibility order; and adaptively balancing said target work load for said GPUs within a single frame, wherein the adaptive balancing comprises:

sorting by said GPUs starting from a middle block of said group of blocks for blending and thereafter alternately applying a blending function from front to back and back to front, outwardly from said middle block; and     checking of two adjacent neighbors by any of said GPUs having completed its rendering; and, if one of said GPU neighbors has an unfinished work load, then taking for rendering a block from one of (a) the back and (b) the front of said one of said GPU neighbors having an unfinished work load.

18. A method for volume rendering a volumetric dataset with multiple graphics processing units (GPUs) coupled to a computer system, comprising:

building a block hierarchy in form of a block tree containing multiple levels of blocks representing multiple partitioning of said volumetric dataset with different granularities;

determining a target work load for each GPU as a percentage of total GPU load;

sorting said GPUs in visibility order according to the largest block assigned to a GPU for a preceding frame;

traversing said block hierarchy in visibility order and partitioning said volumetric data set into a number N of groups of blocks in accordance with a target work load of each respective corresponding GPU, where N equals the number of said GPUs;

sorting blocks within each group in visibility order;

rendering said groups by corresponding respective GPUs to provide respective intermediate images to a display node;

alpha blending said intermediate images in visibility order;

starting multiple rendering threads, one for each GPU, by a main rendering thread;

entering a sleeping mode by said main rendering thread while in an event awaiting loop for sensing one of (a) an event from a rendering thread signaling its completion of rendering and (b) a time-out signal; and     when all GPUs have completed, breaking said event waiting loop and, if a time-out occurs, then     checking by said main rendering thread whether a user has indicated wanting to cancel rendering and,     if so, said main rendering thread notifies said rendering threads to abort.

\* \* \* \* \*